(12) United States Patent
Nakakubo et al.

(10) Patent No.: US 10,167,652 B2
(45) Date of Patent: Jan. 1, 2019

(54) VERTICAL SEISMIC ISOLATION APPARATUS

(71) Applicant: THK CO., LTD., Tokyo (JP)

(72) Inventors: Keisuke Nakakubo, Tokyo (JP); Yoshihito Watanabe, Tokyo (JP); Hiroaki Asakura, Tokyo (JP); Tomokazu Oku, Tokyo (JP); Tetsuya Fukumoto, Tokyo (JP); Ryoji Tomono, Tokyo (JP); Junichi Washida, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/742,999

(22) PCT Filed: Aug. 5, 2016

(86) PCT No.: PCT/JP2016/073080
§ 371 (c)(1),
(2) Date: Jan. 9, 2018

(87) PCT Pub. No.: WO2017/033707
PCT Pub. Date: Mar. 2, 2017

(65) Prior Publication Data
US 2018/0216359 A1 Aug. 2, 2018

(30) Foreign Application Priority Data
Aug. 4, 2016 (JP) .................................. 2016-153582

(51) Int. Cl.
*E04H 9/02* (2006.01)
*F16F 15/04* (2006.01)
*F16F 15/02* (2006.01)

(52) U.S. Cl.
CPC ............... *E04H 9/023* (2013.01); *E04H 9/02* (2013.01); *E04H 9/021* (2013.01); *F16F 15/022* (2013.01); *F16F 15/04* (2013.01); *F16F 2232/06* (2013.01)

(58) Field of Classification Search
CPC ........... E04H 9/021; E04H 9/02; E04H 9/028; E04H 9/023; E04B 1/985; E01D 19/04; F16F 15/022
See application file for complete search history.

(56) References Cited

U.S. PATENT DOCUMENTS 4,108,270 A * 8/1978 Mifsud .................. G01V 1/047
181/114
4,726,161 A * 2/1988 Yaghoubian ............ E04H 9/023
248/585
(Continued)

FOREIGN PATENT DOCUMENTS

JP    6-272735 A    9/1994
JP    10-213177 A    8/1998
(Continued)

OTHER PUBLICATIONS

International Search Report dated Aug. 30, 2016, issued in counterpart International Application No. PCT/JP2016/073080 (2 pages).

*Primary Examiner* — Gisele D Ford
(74) *Attorney, Agent, or Firm* — Westerman, Hattori, Daniels & Adrian, LLP

(57) ABSTRACT

A vertical seismic isolation device includes: a fixed frame; a movable frame arranged on the fixed frame; a support guide mechanism which allows only vertical movement of the movable frame; and a restoration member which maintains a constant distance between the movable frame and the fixed frame. The support guide mechanism includes: a track rail provided on the fixed frame; a moving block assembled to the track rail through rolling elements; a support leg, (Continued)

which has one end coupled to the moving block and another end coupled to the movable frame, and converts vertical movement of the movable frame into a motion of the moving block; and an auxiliary leg, which is half as long as the support leg, and has one end coupled to the support leg at an intermediate position in a longitudinal direction of the support leg and another end coupled to the fixed frame.

6 Claims, 6 Drawing Sheets

(56) References Cited

U.S. PATENT DOCUMENTS

| | | | | |
|---|---|---|---|---|
| 5,005,326 | A * | 4/1991 | Ishimaru | E04B 1/985 248/562 |
| 5,025,599 | A * | 6/1991 | Ishii | E04B 1/985 52/1 |
| 5,025,600 | A * | 6/1991 | Sugimoto | E04B 1/98 248/588 |
| 5,058,350 | A * | 10/1991 | Mochiki | E04B 1/6806 404/52 |
| 5,168,967 | A * | 12/1992 | Abiru | E04B 1/985 188/378 |
| 5,207,081 | A * | 5/1993 | Fuse | D06F 37/20 68/23.1 |
| 5,421,129 | A * | 6/1995 | Sakamoto | E04B 1/985 188/378 |
| 5,520,029 | A * | 5/1996 | Savkar | D06F 37/24 248/610 |
| 5,544,451 | A * | 8/1996 | Cheng | E04B 1/985 52/1 |
| 5,907,880 | A * | 6/1999 | Durazzani | F16F 9/535 188/267 |
| 6,385,917 | B1 | 5/2002 | Konomoto | |
| 6,843,613 | B2 * | 1/2005 | Gelfand | B61L 29/08 244/110 C |
| 7,921,494 | B2 * | 4/2011 | Weinmann | D06F 33/02 68/12.02 |
| 8,671,719 | B2 * | 3/2014 | Chang | D06F 37/04 68/140 |
| 2003/0016996 | A1 * | 1/2003 | Gelfand | E01F 13/123 404/6 |
| 2005/0109912 | A1 * | 5/2005 | Mulder | F16F 15/02 248/564 |
| 2006/0179729 | A1 * | 8/2006 | Li | E04H 9/02 52/167.7 |
| 2007/0199256 | A1 * | 8/2007 | Kaneko | E04H 9/02 52/126.5 |
| 2009/0189407 | A1 * | 7/2009 | Lewis, II | B60N 2/24 296/65.02 |
| 2010/0117275 | A1 * | 5/2010 | Nakamura | B60N 2/502 267/133 |
| 2012/0097825 | A1 * | 4/2012 | Nakakubo | F16F 15/022 248/562 |
| 2012/0204509 | A1 * | 8/2012 | Lim | E04H 9/021 52/393 |
| 2013/0118098 | A1 * | 5/2013 | Constantinou | E04H 9/02 52/167.1 |
| 2014/0008850 | A1 * | 1/2014 | Chapman | F16F 15/022 267/140.11 |
| 2014/0008851 | A1 * | 1/2014 | Chapman | F16M 11/043 267/140.11 |
| 2014/0060296 | A1 * | 3/2014 | Monteil | F41F 3/042 89/1.801 |
| 2015/0000217 | A1 * | 1/2015 | Sarlis | E04H 9/021 52/167.2 |
| 2015/0159370 | A1 * | 6/2015 | Ruan | E02D 27/42 52/167.4 |
| 2016/0068016 | A1 * | 3/2016 | Winshtein | B60G 3/01 301/6.5 |
| 2017/0207608 | A1 * | 7/2017 | Eder | H02B 1/54 |
| 2017/0284087 | A1 * | 10/2017 | Fujita | A47B 97/00 |

FOREIGN PATENT DOCUMENTS

| | | |
|---|---|---|
| JP | 2000-288257 A | 10/2000 |
| JP | 2001-153179 A | 6/2001 |
| JP | 3421088 B2 | 6/2003 |
| JP | 2012-77876 A | 4/2012 |

* cited by examiner

VERTICAL SEISMIC ISOLATION APPARATUS

TECHNICAL FIELD

The present invention relates to a vertical seismic isolation device for use in protection of an object subjected to seismic isolation such as a precision instrument, an electronic device, or an artwork from external vibration, in particular, vertical vibration that is caused by an earthquake or the like.

BACKGROUND ART

Hitherto, as a measure against external vibration that is to be applied to an object subjected to seismic isolation such as a precision instrument, an electronic device, or an artwork at the time of transportation of the object subjected to seismic isolation or under influence of an earthquake on the object subjected to seismic isolation which is placed in a building, a seismic isolation device has been used for the purpose of isolating those objects subjected to seismic isolation from vibration of a floor surface. Further, as the seismic isolation device, there have been known a horizontal seismic isolation device configured to absorb vibration in a horizontal direction, a vertical seismic isolation device configured to absorb vibration in a vertical direction, and a three-dimensional seismic isolation device having functions of both the horizontal seismic isolation device and the vertical seismic isolation device.

As a structure of the vertical seismic isolation device among the above-mentioned seismic isolation devices, as disclosed in Patent Literature 1, there has been known a structure in which seismic isolation units each formed of a four-joint link that is so-called pantograph mechanism are arranged between a building base being a movable frame and a base being a fixed frame. The seismic isolation units illustrated in FIG. 1 of Patent Literature 1 each include four links arranged in a rhombic shape. A tensile coil spring is arranged between a pair of link support points. Between a fixed end coupled to the fixed frame and a free end coupled to the movable frame, an urging force is applied in a direction of separating the fixed end and the free end away from each other. With this configuration, when vibration in the vertical direction is applied between the movable frame and the fixed frame, the free end provided on a side opposed to the fixed end moves horizontally so that the movable frame can freely move in the vertical direction under a state of being isolated from the vibration of the fixed frame.

CITATION LIST

Patent Literature

[PTL 1] JP 10-213177 A

DISCLOSURE OF THE INVENTION

Problems to be Solved by the Invention

The seismic isolation units illustrated in FIG. 1 of Patent Literature 1 are each a four-joint link. Therefore, the seismic isolation units cannot stand alone by simply coupling the fixed end to the fixed frame. Thus, the vertical movement of the movable frame cannot be supported by simply providing the seismic isolation units, with the result that the movable frame involves inclination in the horizontal direction, which is so-called rocking.

Therefore, according to Patent Literature 1, for the purpose of preventing rocking of the movable frame, side walls are provided so as to stand from the fixed frame so that an area involving the vertical movement of the movable frame is surrounded by the side walls, and the movement of the movable frame in the horizontal direction is regulated by layered rubber pieces provided to the side walls.

However, such a structure causes increase in size of the fixed frame with respect to the size of the movable frame. Therefore, there has been a problem in that achievement of a seismic isolation table which is small in size and weight and enables easy handling is difficult. Further, when the movable frame moves in the vertical direction while involving rocking, the layered rubber pieces provided to the side walls are held in abutment against the movable frame. Therefore, there has been a problem in that the layered rubber pieces are liable to hinder smooth vertical movement of the movable frame.

Means for Solving the Problems

The present invention has been made in view of the above-mentioned problems, and has an object to provide a vertical seismic isolation device, which enables smooth vertical movement of the movable frame on which an object subjected to seismic isolation is placed, and is small in size and weight and enables easy handling.

According to one embodiment of the present invention, there is provided a vertical seismic isolation device, including: a fixed frame; a movable frame, which allows a device subjected to seismic isolation to be placed thereon, and is arranged on the fixed frame; a support guide mechanism which allows only vertical movement of the movable frame with respect to the fixed frame; and a restoration member which is configured to urge the movable frame so as to maintain a constant distance between the movable frame and the fixed frame. The support guide mechanism includes: a track rail which is provided on the fixed frame; a moving block, which is assembled to the track rail through intermediation of a large number of rolling elements, and is configured to bear a load which acts in a direction other than a longitudinal direction of the track rail; a support leg, which has one end rotatably coupled to the moving block and another end rotatably coupled to the movable frame, and is configured to convert the vertical movement of the movable frame into a motion of the moving block along a longitudinal direction of the track rail; and an auxiliary leg, which has a length set to one-half of a length of the support leg, and has one end rotatably coupled to the support leg at an intermediate position in a longitudinal direction of the support leg and another end rotatably coupled to the fixed frame.

Effects of the Invention

The support leg and the auxiliary leg of the support guide mechanism construct a so-called Scott-Russell mechanism, and regulate a motion direction of the movable frame with respect to the fixed frame to the vertical direction. Thus, the movable frame moves in the vertical direction without involving rocking.

Further, the end portion of the support leg of the support guide mechanism on the fixed frame side is rotatably coupled to the moving block. The moving block is assembled to the track rail, which is provided to the fixed frame, through intermediation of a large number of rolling elements, and moves along the track rail while bearing the load which acts in the direction other than the longitudinal direction of the track rail. Therefore, even when a large load acts on the movable frame, vertical movement of the movable frame can be smoothly guided. Thus, according to one embodiment of the present invention, it is possible to provide the vertical seismic isolation device, which enables smooth vertical movement of the movable frame on which the object subjected to seismic isolation is placed, and is small in size and weight and enables easy handling.

MODE FOR CARRYING OUT THE INVENTION

Now, detailed description is made of a vertical seismic isolation device according to the present invention with reference to the accompanying drawings.

Figure 1:
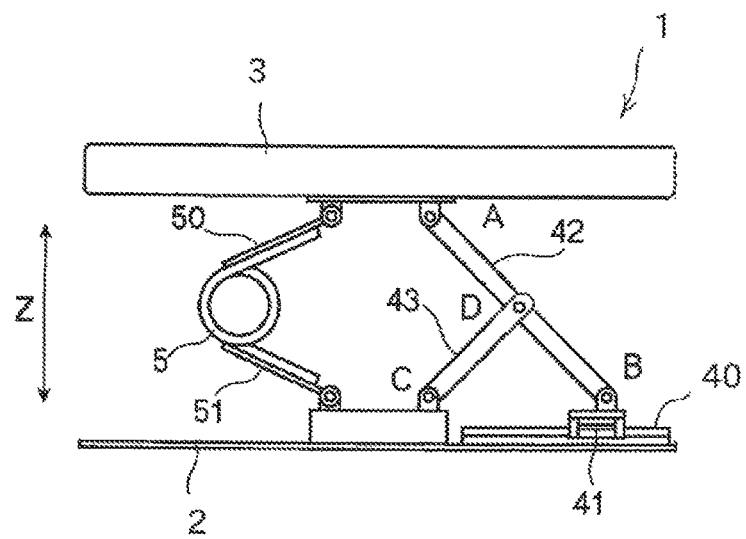
FIG. 1 is a front view for illustrating a vertical seismic isolation device according to a first embodiment to which the present invention is applied.

FIG. 1 is a front view for illustrating a vertical seismic isolation device 1 according to a first embodiment to which the present invention is applied, and is an illustration of a basic configuration of the vertical seismic isolation device according to the present invention. The vertical seismic isolation device 1 (hereinafter referred to as "seismic isolation device") includes a fixed frame 2, a movable frame 3, a support guide mechanism 4, and a restoration member 5. The fixed frame 2 is placed on a floor surface. The movable frame 3 allows an object subjected to seismic isolation such as a precision instrument, an electronic device, or an artwork which requires seismic isolation to be placed thereon. The support guide mechanism 4 is configured to guide a motion of the movable frame 3 with respect to the fixed frame 2 in a vertical direction (direction of the arrow line Z in FIG. 1). The restoration member 5 is configured to elastically support the movable frame 3 with respect to the fixed frame 2.

The support guide mechanism 4 includes a track rail 40, a moving block 41, a support leg 42, and an auxiliary leg 43. The track rail 40 is provided on the fixed frame 2. The moving block 41 freely performs a linear motion along the track rail 40. The support leg 42 couples the movable frame 3 and the moving block 41 to each other. The auxiliary leg 43 couples an intermediate position of the support leg 42 in a longitudinal direction of the support leg 42 and the fixed frame 2 to each other.

Figure 2:
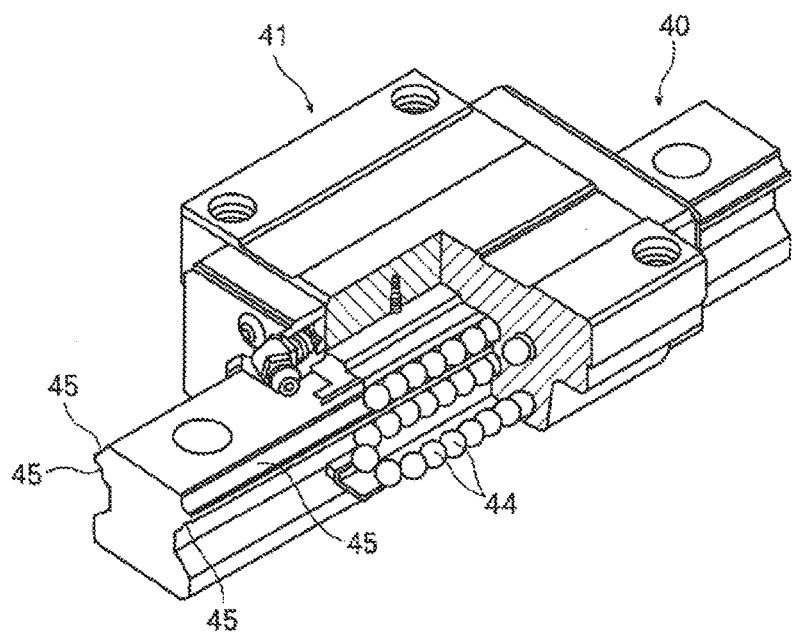
FIG. 2 is a perspective view for illustrating one example of combinations of a track rail and a moving block, which is applicable to the vertical seismic isolation device according to the present invention.

FIG. 2 is a perspective view for illustrating one example of combinations of the track rail 40 and the moving block 41, with a partially broken part for convenience in understanding of an internal configuration. The track rail 40 has rolling surfaces 45 for rolling elements 44 such as balls or rollers along a longitudinal direction of the track rail 40. The moving block 41 has endless circulation paths for the rolling elements 44, and a large number of rolling elements 44 are arranged in the endless circulation paths. The moving block 41 is assembled to the track rail 40 through intermediation of the rolling elements 44. Through rolling of the rolling elements 44 on the rolling surfaces 45 of the track rail 40, the moving block 41 can freely move along the track rail 40. In order to enable the moving block 41 to freely move along the track rail 40 without being separated from the track rail 40 even when a pressing force or a pulling force is applied from the support leg 42 to the moving block 41, it is required that the moving block 41 be capable of bearing any load which acts on a plane orthogonal to the longitudinal direction of the track rail 40 under a state in which the moving block 41 is assembled to the track rail 40. As a combination of the track rail 40 and the moving block 41, a linear guide device (for example, LM Guide manufactured by THK CO., LTD.) which is commercially available can be used. Further, the withstand load of the track rail 40 and the moving block 41 can be suitably selected in accordance with a weight of an object subjected to seismic isolation which is to be placed on the movable frame 3.

The support leg 42 is a link for transmitting vertical movement of the movable frame 3 to the moving block 41. The support leg 42 has one end rotatably coupled to the movable frame 3 and another end rotatably coupled to the moving block 41, and is arranged in an inclined state between the movable frame 3 and the moving block 41. The support leg 42 is rotatably coupled to each of the movable frame 3 and the moving block 41, to thereby allow a motion of the moving block 41 along the track rail 40. Further, the auxiliary leg 43 is a link for regulating a motion of the support leg 42, and has one end rotatably coupled to the support leg 42 and another end rotatably coupled to the fixed frame 2.

The auxiliary leg 43 has a length set to one-half of a length of the support leg 42, and a coupling point of the auxiliary leg 43 and the support leg 42 is at an intermediate position of the support leg 42 in a longitudinal direction of the support leg 42. That is, when there are given a coupling point A of the support leg 42 and the movable frame 3, a coupling point B of the support leg 42 and the moving block 41, a coupling point C of the auxiliary leg 43 and the fixed frame 2, and a coupling point D of the support leg 42 and the auxiliary leg 43, a relationship of AD=BD=CD is satisfied. That is, the support guide mechanism 4 constructs the so-called Scott-Russell mechanism.

In such support guide mechanism 4, when the coupling point A of the movable frame 3 and the support leg 42 moves in the vertical direction, the coupling point B of the moving block 41 and the support leg 42 moves along the track rail 40 on the fixed frame 2. At this time, the relationship of AD=BD=CD is satisfied as described above. Therefore, the coupling point C of the auxiliary leg 43 and the fixed frame 2 is positioned on an imaginary circle having a diameter corresponding to a line segment connecting the coupling point A and the coupling point B, and an angle ACB is always at a right angle. With this, the coupling point A moves straight in the vertical direction directly above the coupling point C without moving in the right-and-left direction in the drawing sheet of FIG. 1. Thus, the movable frame 3 can freely move in the vertical direction while preventing rocking of the coupling point A described above.

The restoration member 5 is formed of a so-called torsion spring, and has one arm portion 50 rotatably coupled to the movable frame 3 and another arm portion 51 rotatably coupled to the fixed frame 2. Therefore, even when the movable frame 3 falls or rises from a regular position at which the movable frame 3 rests, the restoration member 5 applies an urging force to the movable frame 3 to return the movable frame 3 to the regular position.

The restoration member 5 is not limited to the torsion spring, and various elastic members such as a coil spring or a leaf spring can also be used. Further, a mounting position of the restoration member 5 is not limited to the position illustrated in FIG. 1, and may be any other position as long as the restoration member 5 can urge the movable frame 3 so as to maintain a constant distance between the movable frame 3 and fixed frame 2.

Figure 3:
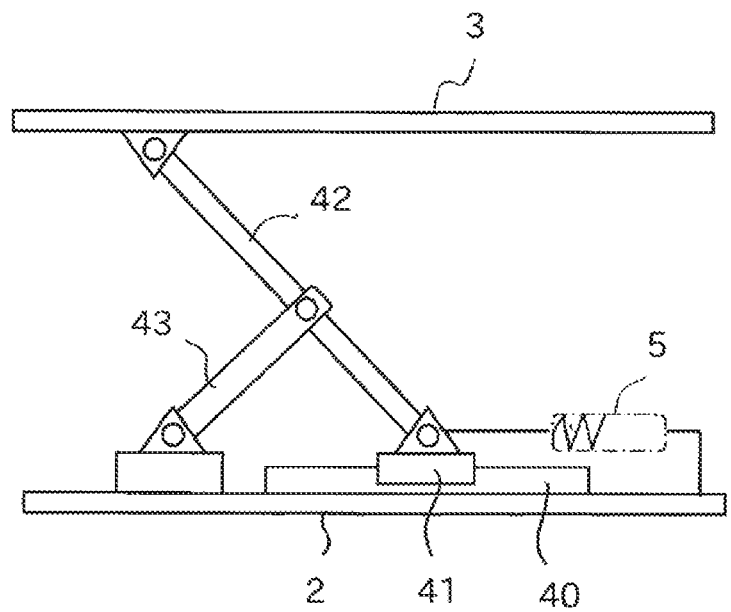
FIG. 3 is a schematic view for illustrating a second arrangement example of a restoration member.
Figure 4:
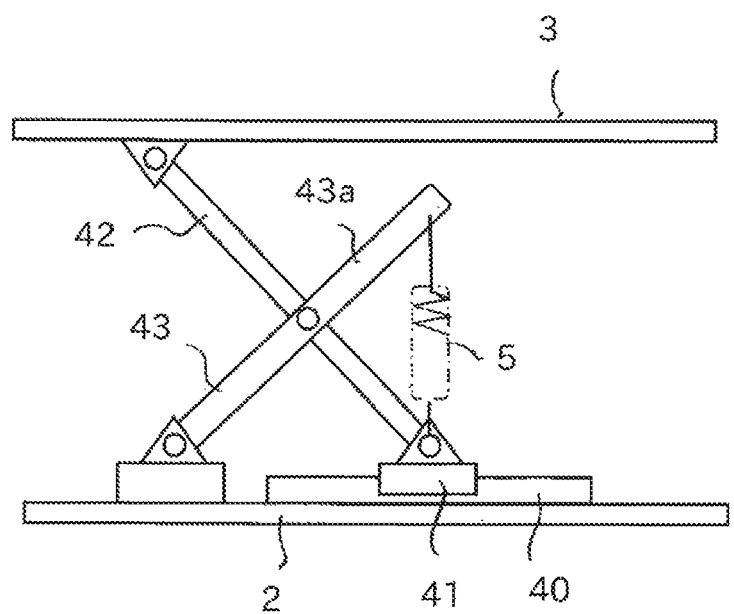
FIG. 4 is a schematic view for illustrating a third arrangement example of the restoration member.

For example, as illustrated in FIG. 3, a coil spring serving as the restoration member 5 may be provided between the moving block 41 and the fixed frame 2 to apply the urging force of the restoration member 5 to the movement of the moving block 41 on the track rail 40. Further, as illustrated in FIG. 4, an extension portion 43a may be provided to the auxiliary leg 43 so that the auxiliary leg 43 intersects with the support leg 42 in an X-shape, and a coil spring serving as the restoration member 5 may be provided between a distal end of the extension portion 43a and the moving block 41 positioned directly below the distal end.

The seismic isolation device 1 according to the first embodiment having the configuration described above is used as follows. That is, the fixed frame 2 is installed on a floor surface of a building or a transport vehicle, and an object subjected to seismic isolation such as a precision instrument or an artwork is placed on the movable frame 3.

When vibration acts on the floor surface due to an event such as transportation or an earthquake, vibration of the floor surface propagates to the object subjected to seismic isolation through the fixed frame 2 and the movable frame 3, and the object subjected to seismic isolation also vibrates. However, as described above, the movable frame 3 can freely move in the vertical direction with respect to the fixed frame 2, and hence the movable frame 3 can vibrate independently of an amplitude and a cycle of the vertical movement of the fixed frame 2. Therefore, the movable frame 3 on which the object subjected to seismic isolation is mounted is in a state of being isolated from the vertical movement of the fixed frame 2. Thus, without being affected by the vertical movement of the floor surface, the movable frame 3 can vibrate in the vertical direction with vibration having a cycle longer than that of the vertical movement of the floor surface. With this, damage to the object subjected to seismic isolation due to the vibration of the floor surface can be effectively prevented.

In this case, in the seismic isolation device according to the present invention, the support guide mechanism 4 configured to support the vertical movement of the movable frame 3 with respect to the fixed frame 2 constructs the so-called Scott-Russell mechanism, and hence the movable frame 3 can move in the vertical direction by the action of the support guide mechanism 4 without involving rocking. Further, the end portion of the support leg 42 of the support guide mechanism 4 on the fixed frame 2 side is coupled to the moving block 41 assembled to the track rail 40. Therefore, even when a significant pressing force or pulling force is applied to the support leg 42, the support leg 42 can smoothly move on the fixed frame 2.

Thus, according to the present invention, as long as the support guide mechanism 4 and the restoration member 5 are provided between the fixed frame 2 and the movable frame 3, the movable frame 3 can smoothly move in the vertical direction with respect to the fixed frame 2 while preventing rocking of the movable frame 3. Further, the support guide mechanism 4 and the restoration member 5 can be arranged between the fixed frame 2 and the movable frame 3, and hence a vertical seismic isolation device which is small in size and weight and enables easy handling can be provided.

Figure 5:
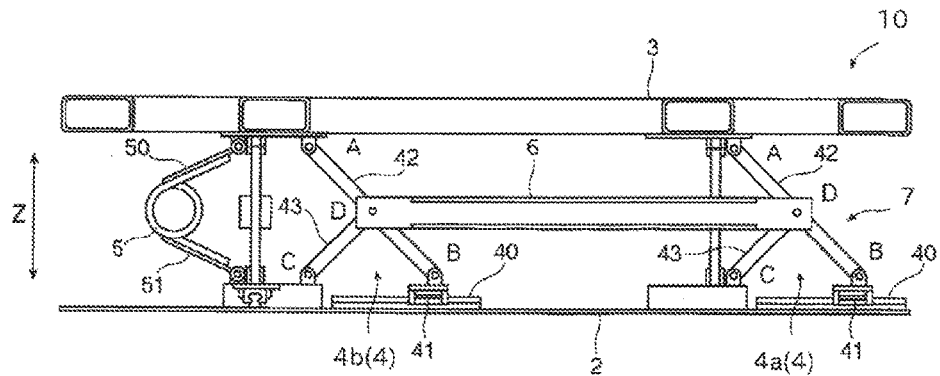
FIG. 5 is a front view for illustrating a vertical seismic isolation device according to a second embodiment to which the present invention is applied.

FIG. 5 is a front view for illustrating a seismic isolation device according to a second embodiment to which the present invention is applied.

In a seismic isolation device 10 according to the second embodiment, a plurality of support guide mechanisms 4 are arranged between the fixed frame 2 and the movable frame 3. Further, a pair of support guide mechanisms 4a and 4b are coupled to each other by a connecting rod 6 to construct one guide unit 7, and a plurality of guide units 7 are arranged between the fixed frame 2 and the movable frame 3. Configurations which are the same as those in the above-mentioned first embodiment are denoted by reference symbols which are the same as those in the first embodiment in the drawings, and detailed description thereof is omitted in the second embodiment.

The guide unit 7 includes the pair of support guide mechanisms 4a and 4b and the connecting rod 6 which synchronizes movements of the pair of support guide mechanisms 4a and 4b. In the pair of support guide mechanisms 4a and 4b which are coupled to each other by the connecting rod 6, the support legs 42 included in the support guide mechanisms are inclined in the same direction on the fixed frame 2, and the track rails 40 are arranged on a straight line on the fixed frame 2. That is, a motion plane of the support leg 42 of the support guide mechanism 4a overlaps with a motion plane of the support leg 42 of the support guide mechanism 4b.

The connecting rod 6 couples coupling points D of the pair of support guide mechanisms 4a and 4b included in the guide unit 7 to each other. That is, one end of the connecting rod 6 is rotatably coupled to the coupling point D of one support guide mechanism 4a, and another end of the connecting rod 6 is rotatably coupled to the coupling point D of another support guide mechanism 4b. Thus, the connecting rod 6 maintains a constant distance between the coupling point D of the one support guide mechanism 4a and the coupling point D of the another support guide mechanism 4b. As long as the connecting rod 6 is rotatably coupled to corresponding parts of the support legs 42 of the pair of support guide mechanisms 4a and 4b, it is not necessary that the connecting rod 6 be coupled to the coupling points D.

Therefore, when the coupling point A is pressed downward in the support guide mechanism 4a that is positioned on the right side in the drawing sheet of FIG. 5, the connecting rod 6 pulls the coupling point D of the support guide mechanism 4b that is positioned on the left side in the drawing sheet of FIG. 5 rightward in the drawing sheet of FIG. 5. Accordingly, the coupling point A of the support guide mechanism 4b on the left side is also lowered by a distance equal to that of the support guide mechanism 4a on the right side. That is, the connecting rod 6 serves to synchronize movements of the pair of support guide mechanisms 4a and 4b included in the guide unit 7.

With this, in the pair of support guide mechanisms 4a and 4b coupled to each other by the connecting rod 6, heights of coupling points A of the movable frame 3 and the support leg 42 are always equal to each other, and hence the movable frame 3 can freely move in the vertical direction while preventing rocking of the movable frame 3 on the fixed frame 2.

Figure 6:
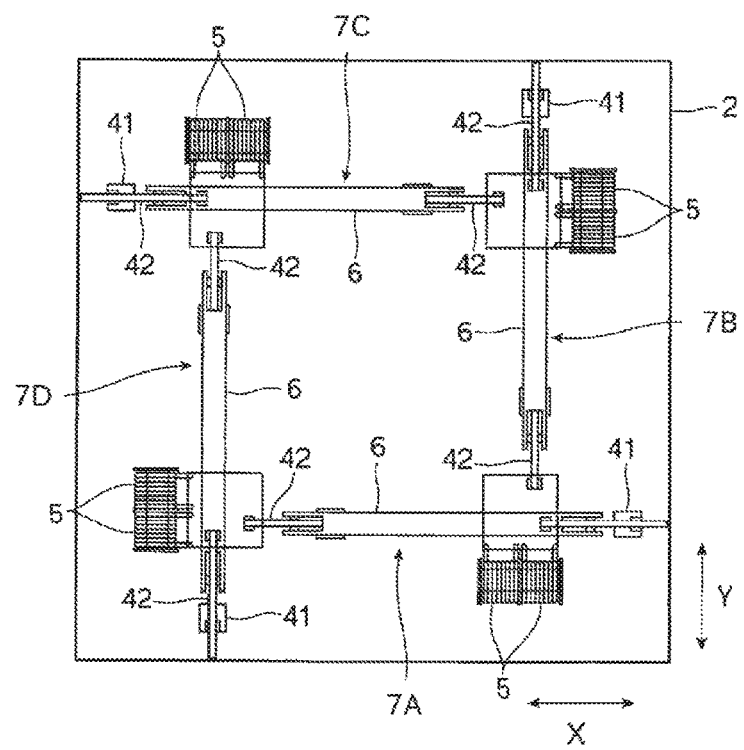
FIG. 6 is a plan view for illustrating the vertical seismic isolation device according to the second embodiment.

FIG. 6 is a plan view for illustrating arrangement of the guide units 7 between the fixed frame 2 and the movable frame 3, and is an illustration of a state in which the movable frame 3 is removed. In the example illustrated in FIG. 6, four guide units 7A, 7B, 7C, and 7D are arranged. Two guide units 7A and 7C are arranged reverse to each other along an X direction, and two guide units 7B and 7D are arranged reverse to each other along a Y direction. That is, directions of inclination of the support legs 42 included in respective guide units 7A, 7B, 7C, and 7D are different from each other depending on the guide units. Further, in the guide units 7A and 7C, the track rails 40 included in the support guide mechanisms 4a and 4b are each provided so that a longitudinal direction of each track rail 40 matches with the X direction. In the guide units 7B and 7D, the track rails 40 included in the support guide mechanisms 4a and 4b are each provided so that a longitudinal direction of each guide rail 40 matches with the Y direction.

According to the seismic isolation device of the second embodiment, the plurality of support guide mechanisms 4 are arranged between the fixed frame 2 and the movable frame 3, and the movements of the support guide mechanisms 4 can be synchronized. Therefore, even when an area of the movable frame 3 is large, the movable frame 3 can freely move in the vertical direction while preventing rocking.

The number and arrangement of the guide units 7 arranged between the fixed frame 2 and the movable frame 3 are not limited to the example illustrated in FIG. 6. For example, three or more guide units 7 may be radially arranged at equal intervals with a center of the movable frame 3 as a reference.

Figure 7:
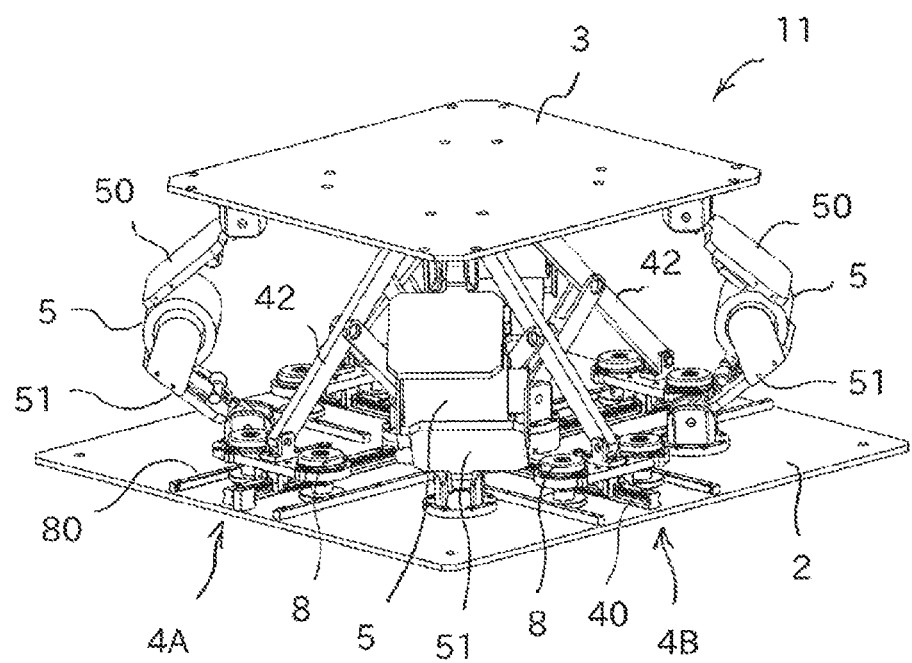
FIG. 7 is a perspective view for illustrating a vertical seismic isolation device according to a third embodiment to which the present invention is applied.

FIG. 7 is a perspective view for illustrating a seismic isolation device according to a third embodiment to which the present invention is applied.

In a seismic isolation device 11 according to the third embodiment, four support guide mechanisms 4A, 4B, 4C, and 4D are arranged between the fixed frame 2 and the movable frame 3. On the assumption that a plurality of seismic isolation devices 11 coupled to each other are to be used, the fixed frame 2 and the movable frame 3 each have a square shape. The support guide mechanisms 4A, 4B, 4C, and 4D are radially arranged in a periphery of a center of the fixed frame 2, and a longitudinal direction of each track rail 40 forms an angle of 90 degrees with respect to a side of an outer edge of the fixed frame 2. Configurations which are the same as those in the above-mentioned first embodiment are denoted by reference symbols which are the same as those in the first embodiment in the drawings, and detailed description thereof is omitted in the third embodiment.

The restoration members 5 are each formed of a so-called torsion spring as in the first embodiment. In order to avoid interference with the support guide mechanisms 4A, 4B, 4C, and 4D, the restoration members 5 are arranged at positions corresponding to four corners of the fixed frame 2, and each have one arm portion 50 rotatably coupled to the movable frame 3 and another arm portion 51 rotatably coupled to the fixed frame 2.

Further, the support guide mechanisms 4A, 4B, 4C, and 4D each include dampers. The dampers apply a reaction force to the vertical movement of the movable frame 3 to settle the vertical vibration, which occurs in the movable frame 3, at an early stage. In the third embodiment, friction dampers 8 of a rotary type are used as the dampers. The friction dampers 8 are fixed to each moving block 41 of the support guide mechanisms 4A, 4B, 4C, and 4D. Pinion gears are provided to rotary shafts of the friction dampers 8, and are in mesh with racks 80 which are provided so as to be parallel to the track rails 40 of the support guide mechanisms 4A, 4B, 4C, and 4D.

Therefore, when the movable frame 3 moves in the vertical direction and causes the moving blocks 41 coupled to the support legs 42 to move on the track rails 40, the friction dampers 8 rotate to apply the reaction force to the motion of the moving blocks 41. With this, the reaction force in the direction of suppressing the vertical movement is always applied to the vertical movement of the movable frame 3, thereby being capable of settling the vertical vibration of the movable frame 3 at an early stage.

Figure 8:
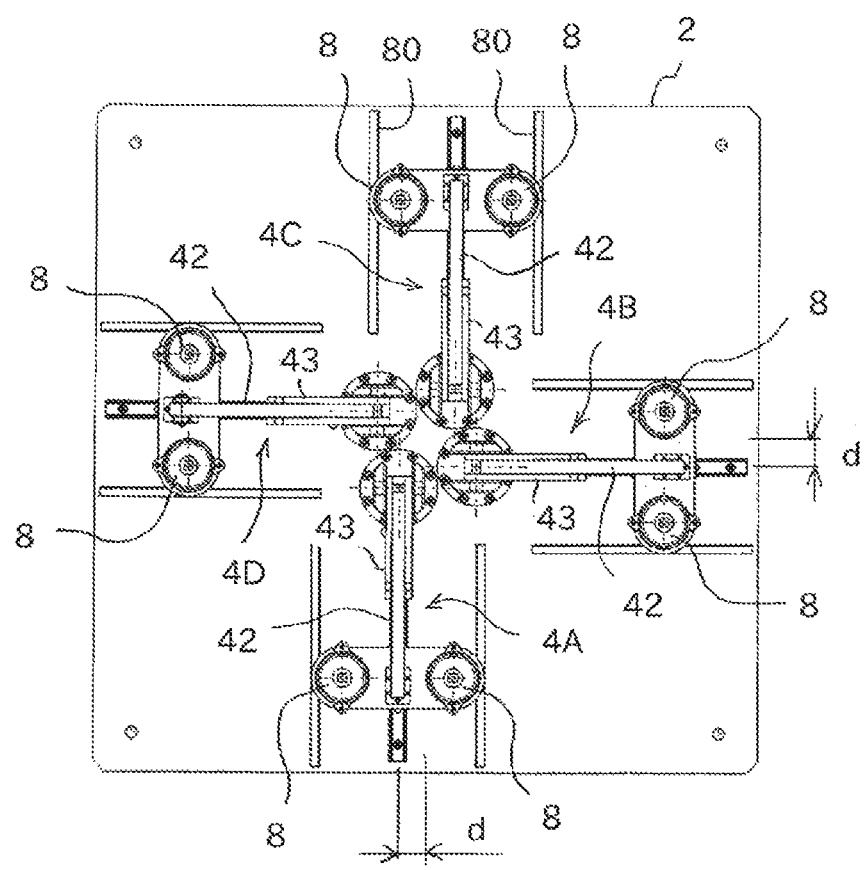
FIG. 8 is a plan view of the vertical seismic isolation device according to the third embodiment.

FIG. 8 is a plan view for illustrating the arrangement of the four support guide mechanisms 4A, 4B, 4C, and 4D on the fixed frame 2, and is an illustration of a state in which the movable frame 3 and the restoration member 5 are removed. The four support guide mechanisms 4A, 4B, 4C, and 4D are equiangularly arranged in a periphery of the center of the fixed frame 2 having a square shape. However, a pair of support guide mechanisms opposed to each other across the center of the fixed frame 2 are not arranged on a straight line, and the support guide mechanisms 4A, 4B, 4C, and 4D are each provided at a position displaced from the center of the fixed frame 2. That is, as illustrated in FIG. 8, a motion plane on which the support leg 42 of each of the support guide mechanisms 4A, 4B, 4C, and 4D operates as a link is present at a position displaced by a distance d from the center of the fixed frame 2.

In the third embodiment, a plurality of seismic isolation devices 11 coupled to each other can be used, and any suitably selected number of seismic isolation devices 11 can be coupled to each other in accordance with the size of an object subjected to seismic isolation to be placed on the movable frame 3, to thereby construct a seismic isolation device unit being an assembly of the seismic isolation devices 11. When two seismic isolation devices 11 adjacent to each other are to be coupled to each other, the connecting rod 6 described in the second embodiment is used. Among the four support guide mechanisms 4A, 4B, 4C, and 4D arranged on each seismic isolation device 11, a corresponding pair of support guide mechanisms are coupled to each other by the connecting rod 6.

Figure 9:
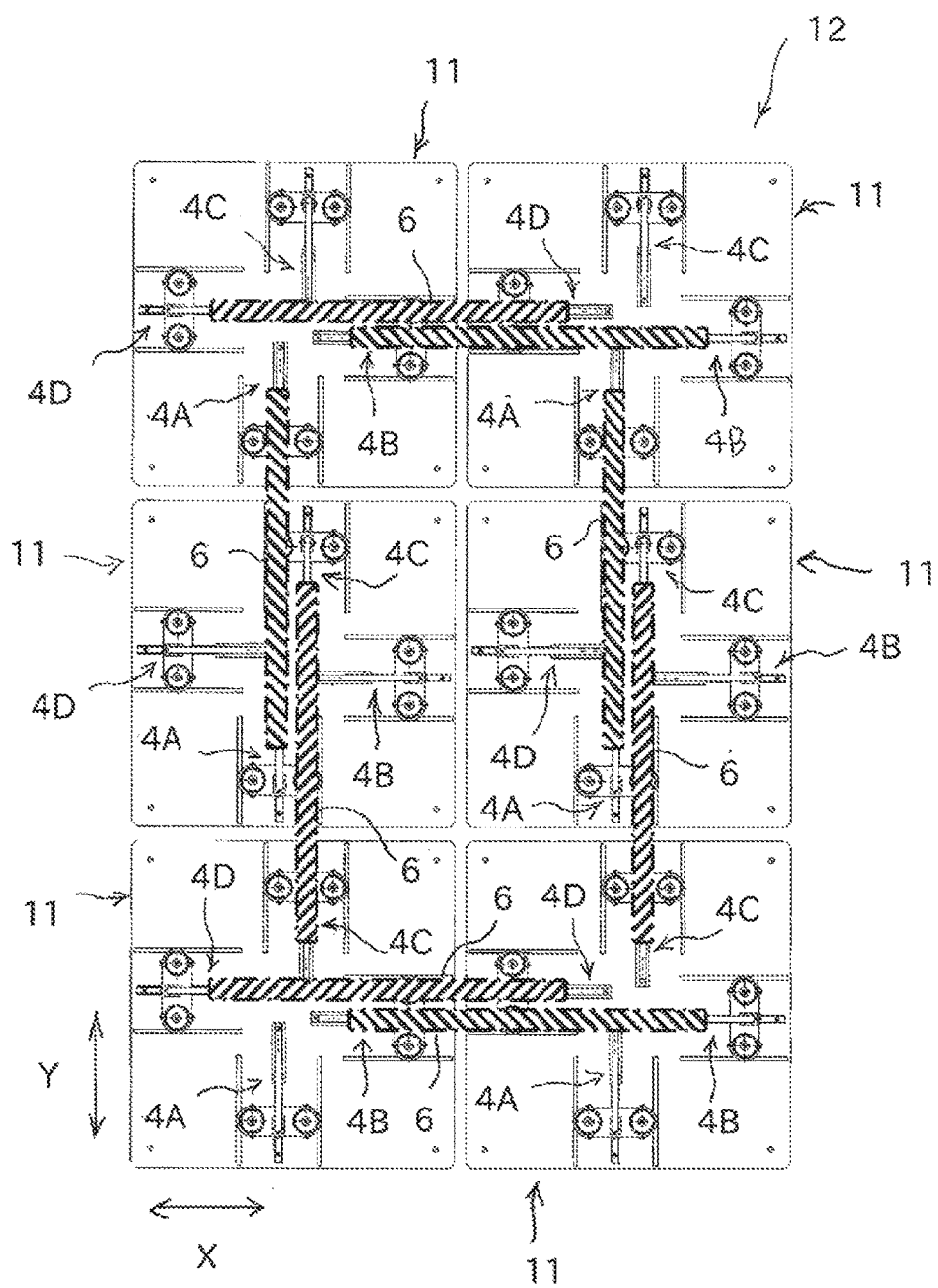
FIG. 9 is a plan view of a vertical seismic isolation device unit which is constructed by a combination of the vertical seismic isolation device according to the third embodiment.

FIG. 9 is an illustration of an example in which six seismic isolation devices 11 are coupled to each other to construct the seismic isolation device unit 12. Each of the members illustrated with oblique lines in FIG. 9 is the connecting rod 6. Among the plurality of support guide mechanisms, the connecting rod 6 couples a pair of support guide mechanisms including support legs 42 which are inclined in the same direction. For example, there are provided the connecting rod 6 which couples the support guide mechanisms 4A to each other, the connecting rod 6 which couples the support guide mechanisms 4B to each other, the connecting rod 6 which couples the support guide mechanisms 4C to each other, and the connecting rod 6 which couples the support guide mechanisms 4D to each other. The connecting rod which couples the support guide mechanisms 4A to each other and the connecting rod which couples the support guide mechanisms 4C to each other are provided along the Y direction. The connecting rod 6 which couples the support guide mechanisms 4B to each other and the connecting rod 6 which couples the support guide mechanisms 4D to each other are provided along the X direction.

When the seismic isolation devices 11 are coupled to each other for use, as described above, the support guide mechanisms 4A, 4B, 4C, and 4D of each seismic isolation device 11 are provided so as to be displaced from the center of the fixed frame 2. Therefore, for example, the connecting rod 6 which couples the support guide mechanisms 4A to each other does not interfere with the connecting rod 6 which couples the support guide mechanisms 4C to each other, and hence two connecting rods 6 which extend in the Y direction can be arranged parallel to each other. Further, the connecting rod 6 which couples the support guide mechanisms 4B to each other does not interfere with the connecting rod 6 which couples the support guide mechanisms 4D to each other, and hence two connecting rods 6 which extend in the X direction can be arranged parallel to each other.

With this, a plurality of seismic isolation devices 11 can be continuously coupled to each other, thereby being capable of assembling the seismic isolation device unit 12 matching with the size of an object subjected to seismic isolation. Further, movements of the pair of support guide mechanisms coupled to each other by the connecting rod 6 are synchronized. Therefore, when the movable frame 3 of any one of the seismic isolation devices 11 is pressed downward, the movable frames 3 of all of a remainder of the seismic isolation devices 11 are pressed downward in response. Thus, even when a large number of seismic isolation devices are coupled to each other, all of the movable frames 3 can freely move in the vertical direction while preventing rocking.

In the above-mentioned third embodiment, the friction dampers are used as dampers configured to settle the vertical vibration of the movable frame 3. However, the dampers to be used for the seismic isolation device of the present invention are not limited to the friction dampers, and there may be used various dampers such as viscous dampers or mass dampers. In particular, the mass dampers are advantageous in that a natural period of vibration generated in the movable frame 3 can be extended, and the mass dampers may be used together with the viscous dampers or the friction dampers.

Further, mounting positions of the dampers can be suitably changed as long as the dampers can apply a reaction force in the vertical direction of the movable frame. For example, the dampers may be directly coupled to the movable frame 3, or may be arranged between the support leg 42 and the auxiliary leg 43 of the support guide mechanism 4 similarly to the restoration member 5 illustrated in FIG. 4.

The invention claimed is:

1. A vertical seismic isolation device, comprising:
a fixed frame;
a movable frame, which allows a device subjected to seismic isolation to be placed thereon, and is arranged on the fixed frame;
a support guide mechanism which allows only vertical movement of the movable frame with respect to the fixed frame; and
a restoration member which is configured to urge the movable frame so as to maintain a constant distance between the movable frame and the fixed frame,
the support guide mechanism including:
a track rail which is provided on the fixed frame;
a moving block, which is assembled to the track rail through intermediation of a large number of rolling elements, and is configured to bear a load which acts in a direction other than a longitudinal direction of the track rail;
a support leg, which has one end rotatably coupled to the moving block and another end rotatably coupled to the movable frame, and is configured to convert the vertical movement of the movable frame into a motion of the moving block along a longitudinal direction of the track rail; and
an auxiliary leg, which has a length set to one-half of a length of the support leg, and has one end rotatably coupled to the support leg at an intermediate position in a longitudinal direction of the support leg and another end rotatably coupled to the fixed frame.

2. The vertical seismic isolation device according to claim 1,
wherein a pair of support guide mechanisms in which the support legs are inclined in the same direction are arranged on a straight line on the fixed frame, and
wherein, in the pair of support guide mechanisms, the support leg of one support guide mechanism and the support leg of another support guide mechanism are coupled to each other by a connecting rod to construct a guide unit.

3. The vertical seismic isolation device according to claim 2, wherein a plurality of guide units are arranged on the fixed frame, and directions of inclination of the support leg of one guide unit and the support leg of another guide unit are different from each other.

4. The vertical seismic isolation device according to claim 1,
wherein four support guide mechanisms are equiangularly arranged on the fixed frame in a periphery of a center of the fixed frame, and
wherein a motion plane of the support leg of each support guide mechanism is displaced from the center of the fixed frame.

5. The vertical seismic isolation device according to claim 1, further comprising a damper configured to apply a reaction force to a motion of the support leg.

6. A vertical seismic isolation device unit, comprising plurality of vertical seismic isolation devices of claim 4,
wherein, in the vertical seismic isolation devices which are adjacent to each other, support legs of the corresponding support guide mechanisms are coupled to each other by a connecting rod.

* * * * *